(12) United States Patent
Nunn (10) Patent No.: US 8,436,766 B1
(45) Date of Patent: May 7, 2013

(54) SYSTEMS AND METHODS FOR SUPPRESSING RADAR SIDELOBES USING TIME AND SPECTRAL CONTROL

(75) Inventor: Carroll J. Nunn, Silver Spring, MD (US)

(73) Assignee: Technology Service Corporation, Silver Spring, MD (US)

( * ) Notice: Subject to any disclaimer, the term of this patent is extended or adjusted under 35 U.S.C. 154(b) by 263 days.

(21) Appl. No.: 12/940,599

(22) Filed: Nov. 5, 2010

Related U.S. Application Data (60) Provisional application No. 61/258,950, filed on Nov. 6, 2009.

(51) Int. Cl.
*G01S 13/00* (2006.01)

(52) U.S. Cl.
USPC ............................ 342/159; 342/192; 342/195

(58) Field of Classification Search .................. 342/159, 342/192, 195
See application file for complete search history.

(56) References Cited

U.S. PATENT DOCUMENTS

| | | | |
|---|---|---|---|
| 4,042,925 A | 8/1977 | Albanese et al. | |
| 4,095,225 A * | 6/1978 | Erikmats | 342/195 |
| 4,379,295 A * | 4/1983 | Lewis et al. | 342/201 |
| 4,566,010 A * | 1/1986 | Collins | 342/201 |
| 4,580,139 A * | 4/1986 | Weathers et al. | 342/189 |
| 4,591,857 A | 5/1986 | Thor | |
| 4,626,853 A | 12/1986 | Lee et al. | |
| 4,669,051 A | 5/1987 | Barr | |
| 4,901,082 A | 2/1990 | Schreiber et al. | |
| 5,036,328 A | 7/1991 | Nakamura et al. | |
| 5,070,337 A * | 12/1991 | Chen et al. | 342/201 |
| 5,115,244 A | 5/1992 | Freeman et al. | |
| 5,128,683 A | 7/1992 | Freeman et al. | |
| 5,309,161 A | 5/1994 | Urkowitz et al. | |
| 5,389,933 A * | 2/1995 | Golinsky | 342/201 |
| 5,414,428 A * | 5/1995 | Gallagher et al. | 342/132 |
| 5,440,311 A * | 8/1995 | Gallagher et al. | 342/132 |
| 5,481,270 A * | 1/1996 | Urkowitz et al. | 342/101 |
| 5,497,160 A | 3/1996 | Koehler et al. | |
| 5,568,150 A | 10/1996 | Taylor et al. | |

(Continued)

FOREIGN PATENT DOCUMENTS

| | | |
|---|---|---|
| DE | 43 825 | 4/1900 |
| DE | 36 31 586 | 3/1988 |

(Continued)

OTHER PUBLICATIONS

"Multi-Parameter Local Optimization for the Design of Superior Matched Filter Polyphase Pulse Compression Codes", Nunn, Carroll J. IEEE International Radar Conference, pp. 435-440, 2000.*

(Continued)

*Primary Examiner* — Jack W Keith
*Assistant Examiner* — Peter Bythrow
(74) *Attorney, Agent, or Firm* — Finnegan, Henderson, Farabow, Garrett & Dunner LLP (57) ABSTRACT

Methods and systems are disclosed for radar pulse compression signal processing. Methods include generating a function that quantifies radar signal characteristics and using a processor to calculate time-domain derivatives of the function in the frequency domain. Methods also include generating a function that quantifies radar signal characteristics as a sum of sidelobe levels; and using a processor to control the sidelobe levels by obtaining gradients of the function in the spectral domain.

34 Claims, 4 Drawing Sheets

U.S. PATENT DOCUMENTS

| | | | |
|---|---|---|---|
| 5,708,436 A | 1/1998 | Loiz et al. | |
| 5,731,784 A | 3/1998 | Barron et al. | |
| 5,786,788 A * | 7/1998 | Schober et al. | 342/159 |
| 5,808,580 A | 9/1998 | Andrews | |
| 5,812,082 A | 9/1998 | Moreira et al. | |
| 6,044,336 A * | 3/2000 | Marmarelis et al. | 702/190 |
| 6,061,589 A | 5/2000 | Bridges et al. | |
| 6,067,043 A | 5/2000 | Faure et al. | |
| 6,078,281 A | 6/2000 | Milkovich et al. | |
| 6,255,985 B1 * | 7/2001 | Towner et al. | 342/165 |
| 6,392,588 B1 | 5/2002 | Levanon | |
| 6,405,147 B1 | 6/2002 | Fera | |
| 6,704,438 B1 | 3/2004 | Alexandru | |
| 6,781,541 B1 | 8/2004 | Cho | |
| 6,822,606 B2 | 11/2004 | Ponsford et al. | |
| 6,879,281 B2 | 4/2005 | Gresham et al. | |
| 6,977,609 B2 | 12/2005 | Pleva et al. | |
| 7,019,686 B2 | 3/2006 | Hester et al. | |
| 7,151,483 B2 | 12/2006 | Dizaji et al. | |
| 7,151,484 B2 | 12/2006 | Shinonaga et al. | |
| 7,492,312 B2 * | 2/2009 | Fam et al. | 342/159 |
| 7,843,382 B2 * | 11/2010 | Fam et al. | 342/175 |
| 2006/0284757 A1 * | 12/2006 | Zemany | 342/22 |
| 2008/0037611 A1 * | 2/2008 | Coon | 375/145 |
| 2008/0111734 A1 * | 5/2008 | Fam et al. | 342/195 |
| 2008/0136704 A1 | 6/2008 | Chan et al. | |
| 2010/0067615 A1 * | 3/2010 | Dorpinghaus et al. | 375/295 |
| 2010/0149022 A1 * | 6/2010 | Fam et al. | 342/195 |
| 2011/0241931 A1 * | 10/2011 | Krich et al. | 342/159 |

FOREIGN PATENT DOCUMENTS

| | | |
|---|---|---|
| DE | 42 40 225 | 1/1994 |
| GB | 2 259 209 | 3/1993 |
| JP | 57-91468 | 7/1982 |

OTHER PUBLICATIONS

Carroll Nunn et al., Multi-Parameter Local Optimization for the Design of Superior Matched Filter Polyphase Pulse Compression Codes, First pulse compression paper, presented at Radar 2000 Conference, 2000.

Carroll Nunn, Constrained Optimization Applied to Pulse Compression Codes, and Filters, presented at Radar 2005 Conference, 2005.

Carroll Nunn, A Modulation and De-Modulation Technique for Quadraphase Pulse Compression Codes, poster session at Radar 2005 Conference, 2005.

Carroll Nunn et al., Performance of Pulse Compression Code and Filter Pairs Optimized for Loss and Integrated Sidelobe Level, Radar 2007 Conference, 2007.

Carroll Nunn et al., Polyphase Pulse Compression Codes with Optimal Peak and Integrated Sidelobes.

Carroll Nunn et al., Real Time Compatible, Phase Only Pattern Notching Algorithm for Very Large Arrays, Tri-Service Conference, Jun. 2006.

Adly T. Fam et al., Multiplicative Mismatched Filter for Optimum Sidelobe Suppression in Barker Codes.

Michael J. Lindenfeld, Sparse Frequency Transmit and Receive Waveform Design, IEEE Transactions on Aaerospace and Electronic Systems, vol. 40, No. 3, Jul. 3, 2004, pp. 851-860.

S.D. Green et al., Investigation of wide bandwidth HF radar waveforms, 1995 The Institution of Electrical Engineers, pp. 2/1 to 2/8.

S.D. Green et al., Improving the Range/Time Sidelobes of Large Bandwidth Discontinuous Spectra HF Radar Waveforms, HF Radio Systems and Techniques, Jul. 7-10, 1997, Conferecne Publication No. 411, pp. 246-250.

\* cited by examiner

SYSTEMS AND METHODS FOR SUPPRESSING RADAR SIDELOBES USING TIME AND SPECTRAL CONTROL

I. RELATED APPLICATION(S)

The present application claims the benefit of priority of U.S. Provisional Patent Application No. 61/258,950, filed Nov. 6, 2009, which is incorporated by reference herein in its entirety.

II. FIELD OF THE INVENTION

The present disclosure relates to the field of pulse compression in radar signal processing, and more particularly, to systems and methods for suppressing radar sidelobes using time and spectral control.

III. BACKGROUND OF THE DISCLOSURE

In the field of radar signal processing, a technique known as "pulse compression" has long been used to improve the range resolution of radars. In general, pulse compression involves modulating a transmitted radar pulse (i.e., with a "code" or "waveform") and then correlating the received signal with an appropriate "filter" function, based on the known modulation.

One reason for implementing a pulse compression system is the desire to obtain the high range resolution of a short pulse, while realizing the higher signal-to-noise ratio (SNR) of a longer uncoded pulse. This is accomplished by increasing the bandwidth of the longer pulse by introducing the signal modulation. This technique can extend the maximum detectable range, improve the probability of detection ($P_D$), and affect a lower probability of intercept (LPI), by lowering the peak power requirements for the same SNR.

A major principle in radar is the coherent combination of signals in order to affect what signals are seen and what signals are suppressed in order to separate targets from clutter. One manifestation of this coherent combination is in spatial domain processing, which takes the form of azimuth and elevation transmit/receive antenna beams. Another manifestation is in the time domain, in which targets in a range cell of limited size are enhanced while targets outside this range cell are suppressed. In this second form there is a correspondence between the range cell size (resolution) and the signal bandwidth in the frequency domain. In all three domains (i.e. spatial, temporal and frequency) there will be unwanted "sidelobes" that can be sources of interference and false-targets. The present disclosure relates to pulse compression aspects, which include both time and frequency components.

The set of performance measures that determine the design of the code and the associated filters used in pulse compression include SNR loss, code amplitude, peak response broadening, and sidelobe behavior. The design of such codes and filters constitutes a tradeoff among the various performance measures. Optimized pulse compression search techniques have been developed that can compute many codes and filter combinations in response to each set of performance requirements. The corresponding filters can be "matched" to the codes in length/time and in amplitude and phase, so as to improve SNR gain and resolution, or "mismatched" in length/time, amplitude and phase, so as to reduce the correlation of sidelobes. One prior method of minimizing sidelobes by optimizing matched filter codes is described in "Multi-parameter Local Optimization for the Design of Superior Matched Filter Polyphase Pulse Compression Codes," by Nunn and Welch. One benefit of using a matched filter is that it maximizes the gain in the SNR (i.e., the processing gain). Hence, the matched filter has no SNR loss because its filter characteristics are precisely matched to the received waveform. Conversely, when implementing a mismatched filter to reduce correlation sidelobes, some of this SNR processing gain and/or target resolution may be lost.

Synthetic aperture radar (SAR) is a particular type of radar that uses a plurality of small, low-directivity, stationary antennas scattered near or around the target area, or an antenna moving over stationary targets. Echo waveforms received by the moving or plurality of antennas can be processed to resolve the target. In some cases, SAR radar may be improved by combining many radar pulses to form a synthetic aperture, using additional antennas or significant additional processing. SAR operation typically involves transmitting signals that cover a broad spectrum, or frequency bandwidth, to obtain desirable resolution (e.g., 200 MHz to 2 GHz). For example, in SAR applications, the bandwidth occupied by the radar is so large that it overlaps with large swaths of heavily utilized and important spectral regions. These applications tend to cause heavy in-band, and sometimes out-of-band, spectral interference.

The demands and prevalence of modern electronic communications, navigation, and other systems make it difficult to obtain large swaths of contiguous bandwidth. In the real world, spectrum is a precious commodity that is carefully managed. For example, it may be necessary to satisfy spectrum managers that restrict transmission frequency bandwidth. Although radar designers have developed various methods to reduce time sidelobes, they have been less successful at minimizing spectral sidelobes and in band spectral properties. As a result, many of these pulse compression codes have not been heavily utilized in real world radar systems because of their spectral shortcomings. For general pulse compression applications, these out-of-band spectral emissions can interfere with other communications or radar devices at nearby frequencies. In broadband applications, the problem is even more serious. These spectral interference problems are both time and location dependant.

Thus, for many applications, most notably SAR applications, it is important to have available methods to rapidly and simultaneously control both the time sidelobes and spectral characteristics of these transmit waveforms. Nunn has developed methods to achieve fine control over time sidelobe code characteristics, such as peak sidelobe levels (PSLs) or integrated sidelobe levels (ISLs) of discrete, constant amplitude pulse compression codes using constrained optimization techniques. Nunn has also used the same methodology to create mismatched filters with excellent ISL, PSL and loss characteristics. Previous to the current effort, these methods have not been used to address the spectral issues.

Accordingly, there is a need for improved techniques for suppressing radar sidelobes by using time and spectral control. The systems and methods of the present disclosure solve one or more of the problems set forth above and/or other problems in the art.

IV. SUMMARY OF THE DISCLOSURE

In accordance with one disclosed exemplary embodiment, a computer-implemented method is disclosed for suppressing radar sidelobes in pulse compression signal processing. The method includes creating an objective function that quantifies radar signal characteristics; defining spectral and time constraints to further constrain the objective function; converting the objective function into an unconstrained optimization problem; and using a processor to perform a gradient descent method to solve the unconstrained optimization problem and generate an optimized radar waveform.

In accordance with one disclosed exemplary embodiment, a computer-implemented method is disclosed for suppressing radar sidelobes in pulse compression signal processing. The method includes creating an objective function that quantifies radar signal characteristics as a sum of integrated sidelobe levels of a radar pulse; defining spectral and time constraints to further constrain the objective function; converting the objective function into an unconstrained optimization problem using a penalty method; and using a processor to obtain gradients of the unconstrained optimization problem in the spectral domain.

In accordance with one disclosed exemplary embodiment, a system is disclosed for suppressing radar sidelobes in pulse compression signal processing. The system includes a memory configured to store instructions for generating an optimized radar waveform; and a processor configured to: receive an objective function that quantifies radar signal characteristics; define spectral and time constraints to further constrain the objective function; convert the objective function into an unconstrained optimization problem; and use a gradient descent method to solve the unconstrained optimization problem and generate an optimized radar waveform.

In accordance with one disclosed exemplary embodiment, a computer-implemented method is disclosed for generating an optimized mismatched filter for a pulse compression radar system. The method includes receiving spectral and time constraints that define a radar pulse; creating an objective function that quantifies radar signal characteristics as a sum of integrated sidelobe levels of a radar pulse, based on the spectral and time constraints; converting the objective function into an unconstrained optimization problem using a penalty method; and using a processor to obtain gradients of the unconstrained optimization problem in the spectral domain.

In accordance with one disclosed exemplary embodiment, a computer-implemented method is disclosed for suppressing radar sidelobes in pulse compression signal processing. The method includes generating a function that quantifies radar signal characteristics; and using a processor to calculate time-domain derivatives of the function in the frequency domain.

In accordance with one disclosed exemplary embodiment, a computer-implemented method is disclosed for suppressing radar sidelobes in pulse compression signal processing. The method includes generating a function that quantifies radar signal characteristics; and using a processor to optimize time and spectral characteristics of the radar signal characteristics using frequency domain calculations.

In accordance with one disclosed exemplary embodiment, a computer-implemented method is disclosed for suppressing radar sidelobes in pulse compression signal processing. The method includes generating a function that quantifies radar signal characteristics as a sum of functions of sidelobe levels; and using a processor to minimize the function by obtaining gradients of the function in the spectral domain.

In accordance with one disclosed exemplary embodiment, a computer-implemented method is disclosed for suppressing radar sidelobes in pulse compression signal processing. The method includes generating a function that quantifies radar signal characteristics as a sum of functions of sidelobe levels; and using a processor to control the sidelobe levels by obtaining gradients of the function in the spectral domain.

In accordance with one disclosed exemplary embodiment, a system for suppressing radar sidelobes in pulse compression signal processing. The system includes memory configured to store instructions for generating an optimized radar waveform. The system also includes a processor configured to generate a function that quantifies radar signal characteristics as a sum of functions of sidelobe levels; and control the sidelobe levels by obtaining gradients of the function in the spectral domain.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings, which are incorporated in and constitute a part of this specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

VI. DETAILED DESCRIPTION OF THE DRAWINGS

Reference will now be made in detail to the present embodiments of the disclosure, certain examples of which are illustrated in the accompanying drawings.

Figure 1:
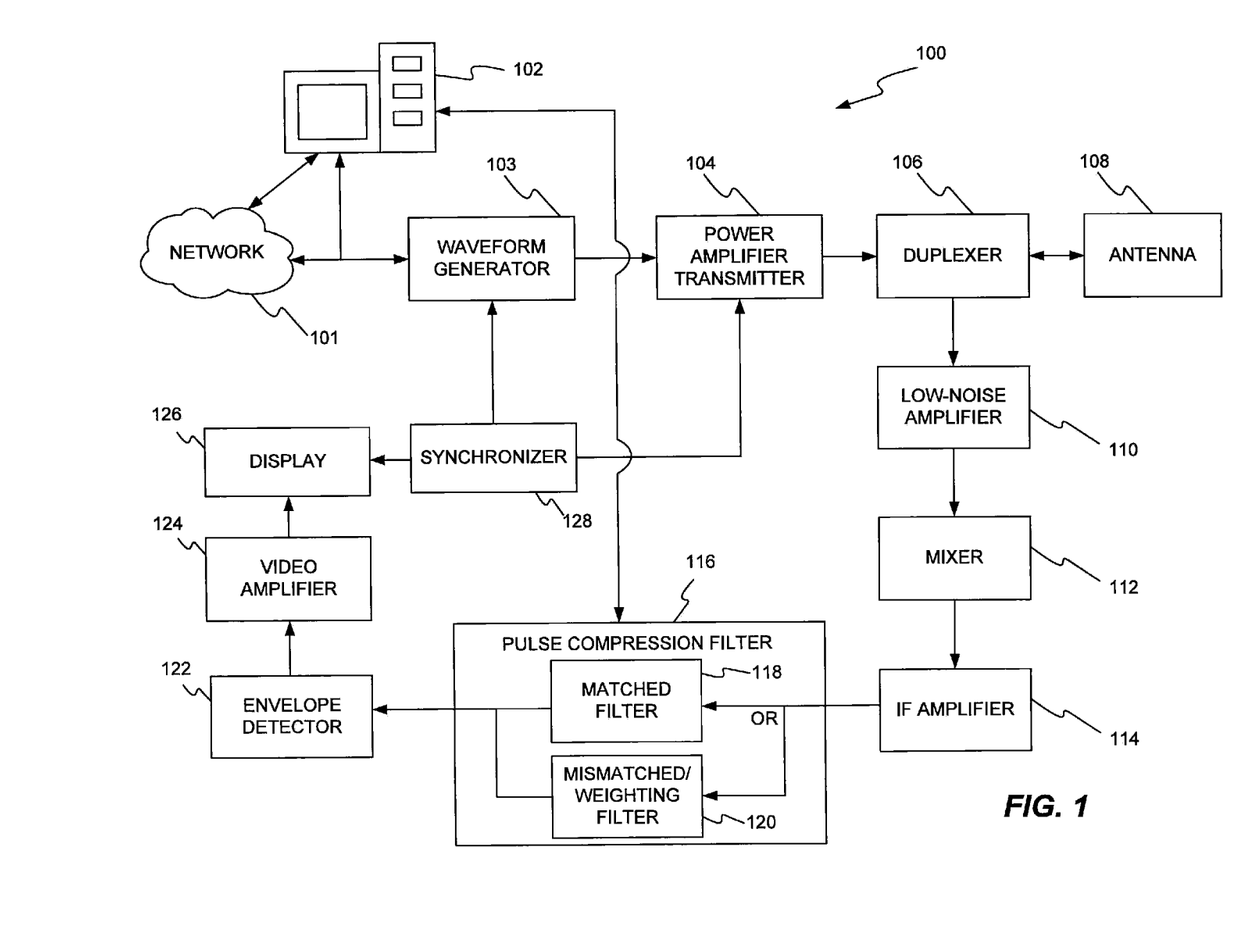
FIG. 1 depicts an exemplary radar pulse compression system consistent with embodiments of the present disclosure.

FIG. 1 depicts an exemplary radar pulse compression system 100 consistent with embodiments of the present disclosure. Radar pulse compression system 100 may include a waveform generator 103, which is configured to generate a low power waveform signal. Waveform generator 103 may be provided in communication with a power amplifier transmitter 104, which is configured to increase the power to the desired peak transmit power. Power amplifier transmitter 104 may be provided in communication with a duplexer 106, which is provided in communication with a radar antenna 108 and configured to switch between transmission and receiving modes. Duplexer 106 may also be provided in communication with a low-noise amplifier 110, which is configured to amplify the received echo signal. Low-noise amplifier 110 may be provided in communication with a mixer 112, which is configured to mix the received signal to an intermediate frequency (IF). Mixer 112 may be provided in communication with an IF amplifier 114, which is configured to amplify the IF signal. IF amplifier 114 may be provided in communication with a pulse compression filter 116, which is configured to process the received echo to yield a narrow compressed pulse response, with a mainlobe width that does not depend on the duration of the transmitted pulse. Pulse compression filter 114 may include a matched filter 118 and/or a mismatched/weighting filter 120. The output signal from pulse compression filter 116 may then be processed through an envelope detector 122, a video amplifier 124, and/or any other desired signal processing apparatus, before being directed to a display 126. A synchronizer 128 may be provided in communication with display 126, waveform generator 103, and/or power amplifier transmitter 104.

In one embodiment, radar pulse compression system 100 may also include a computer 102 provided in communication with waveform generator 103, pulse compression filter 116, and/or a network 101, such as a local-area network (LAN), or a wide-area network (WAN), such as the Internet. Computer 102 may include any type of memory configured to store electronic data, and any type of processor configured to execute instructions and/or perform data operations. In one embodiment, computer 102 may be configured to generate an optimized waveform/filter combination useful in radar pulse compression. Thus, waveform generator 103 may be configured to receive one or more optimized waveforms from computer 102 and/or from other computers connected to network 101. Additionally, or alternatively, waveform generator 103 may include a memory and a processor configured to generate one or more optimized waveforms, consistent with the exemplary methods described herein.

Figure 2A:
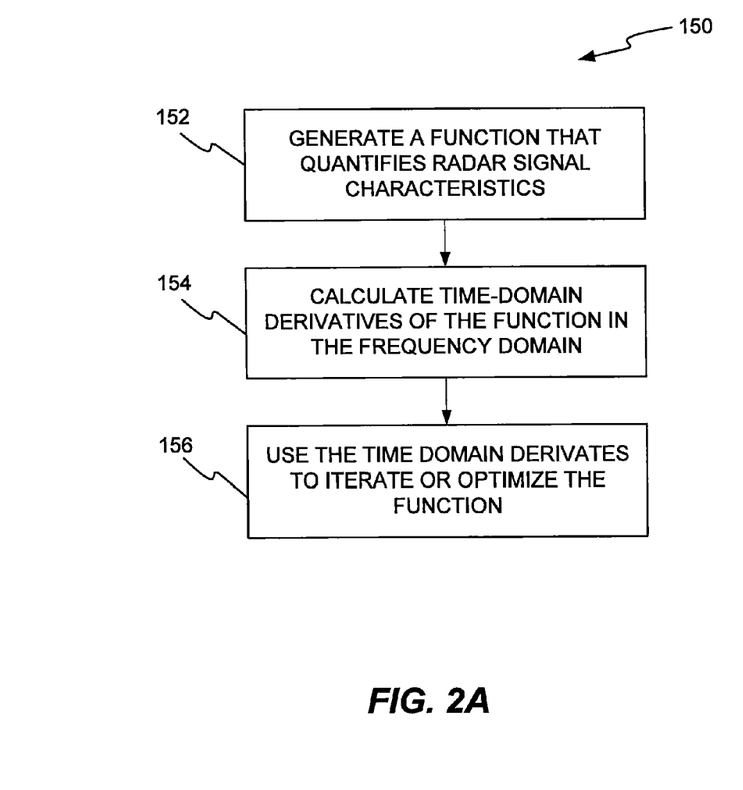
FIG. 2 depicts flowcharts of exemplary methods for quantifying radar signal characteristics and obtaining gradients in the spectral domain.
Figure 2B:
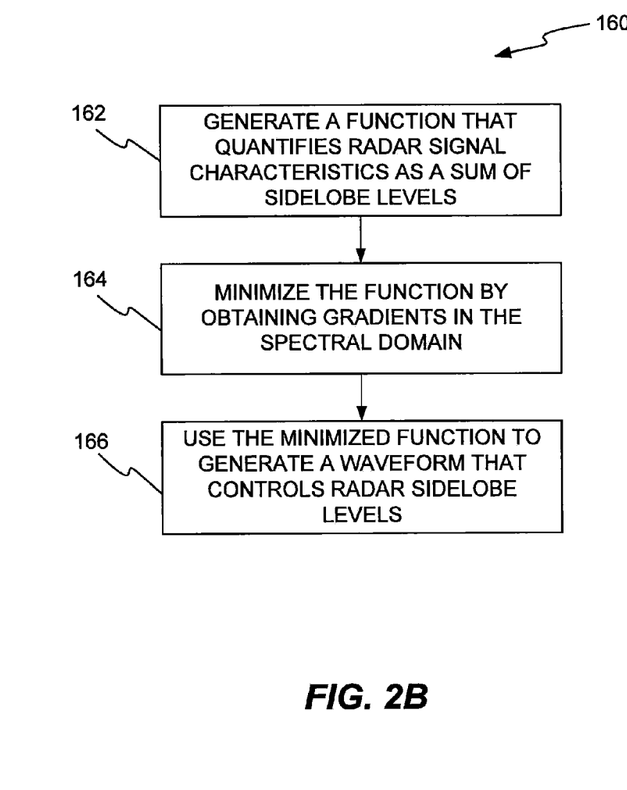
Figure 3:
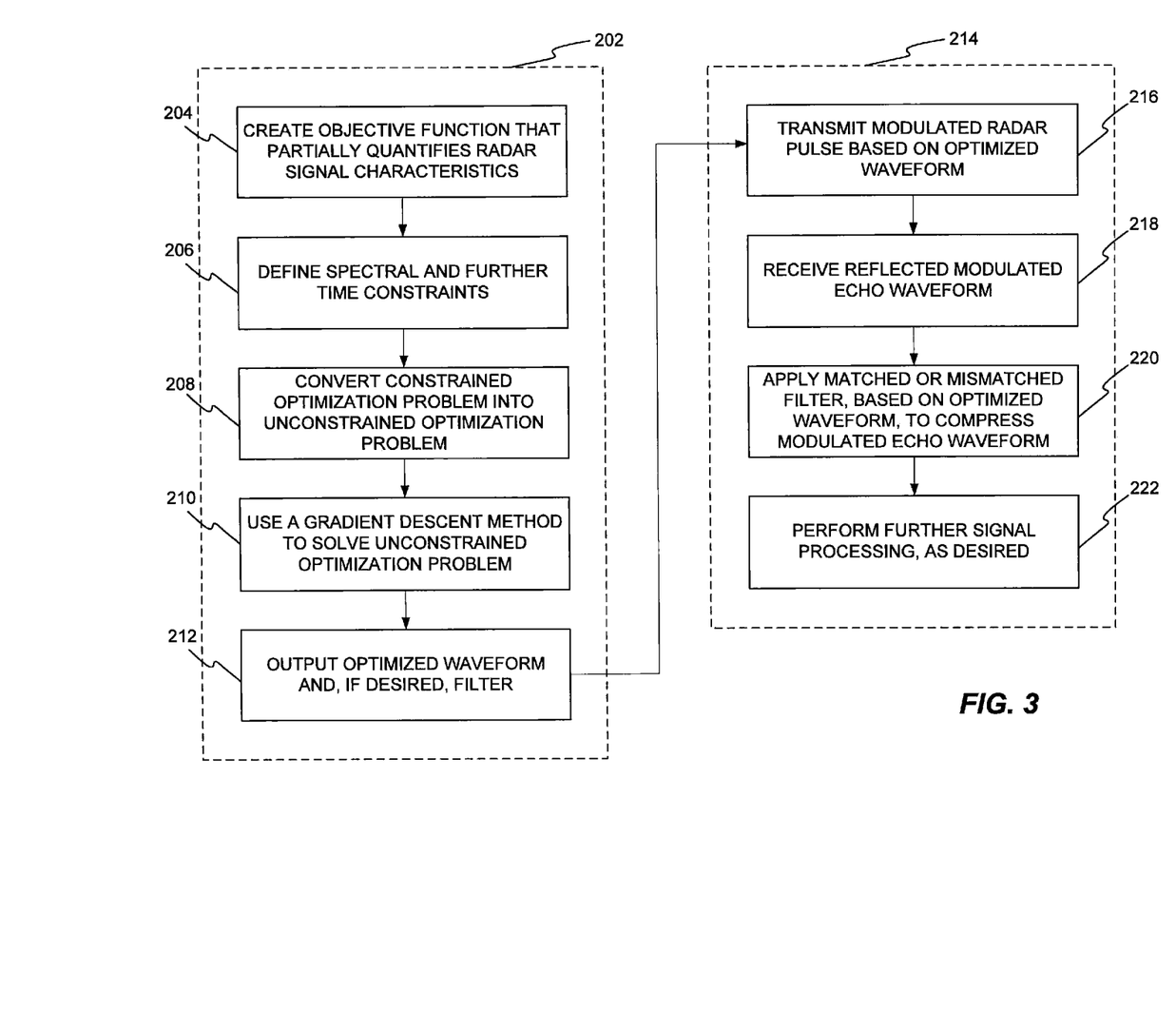
FIG. 3 depicts a flowchart of an exemplary method of generating an optimized waveform and an exemplary method of operating a radar pulse compression system using an optimized waveform.
Figure 4:
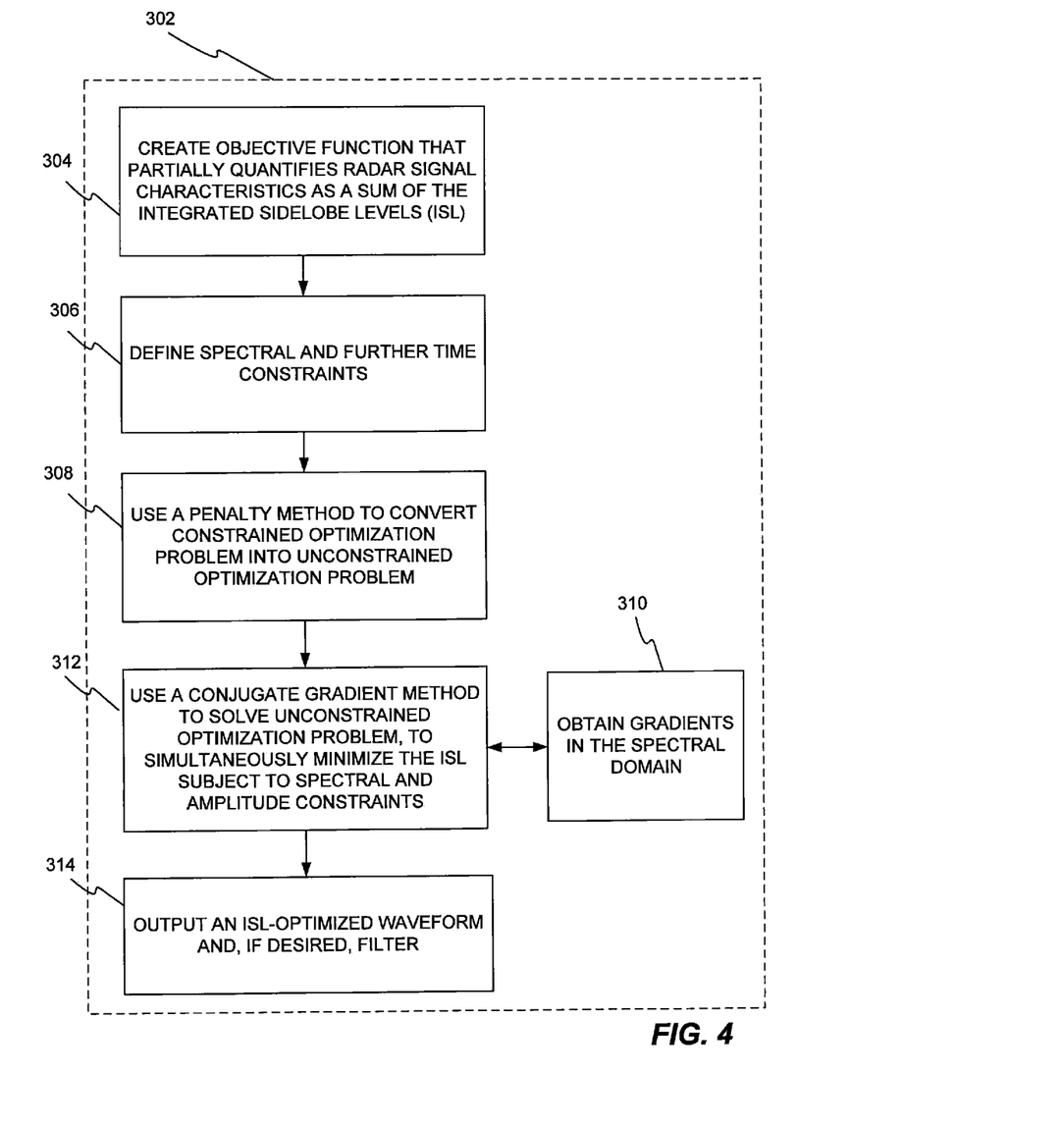
FIG. 4 depicts a flowchart of another exemplary embodiment of a method of generating an optimized waveform for a radar pulse compression system.

Thus, radar pulse compression system 100 may be configured to generate an optimized waveform/filter pair and to perform radar pulse compression based on the optimized waveform. FIGS. 2-4 depict exemplary embodiments of methods for defining a function of radar signal characteristics, obtaining time-domain derivatives of the function in the frequency domain, generating an optimized waveform using the time-domain derivates, and performing radar pulse compression based on the optimized waveform.

In general, constrained optimization techniques may be used to control spectral emissions while at the same time maintaining adequate time sidelobe control. Because SAR applications require waveforms with large time-bandwidth (BT) products and suitable time sidelobes, efficient methods are now disclosed for creating the derivatives needed by the constrained optimization process to control the spectrum. These efficient computation methods are simultaneously applied to the associated time sidelobe and spectral characteristics. In these new methods, many needed calculations may be performed in the frequency domain using fast Fourier transforms (FFTs). Many of these calculations, if done in the time domain, would result in processing on the order of $10^2$, whereas doing these calculations in the frequency domain results in a process that has calculations on the order of $\log_2(N)*N$, where N is the number of degrees of freedom used to describe the waveform or filter. The resulting efficiency allows for the simultaneous optimization of spectral characteristics and time sidelobe characteristics for applications requiring large time-bandwidth products.

Accordingly, systems and methods are disclosed in which time and spectral characteristics of a constant (or near constant) amplitude pulse compression code or waveform are optimized using frequency domain calculations instead of time domain calculations. Specifically, a method is disclosed for minimizing an objective function that can be used to control ISLs and PSLs in the time domain and spectral levels in the frequency domain, by calculating the time-domain derivatives of this objective function in the frequency domain. One exemplary embodiment of this technique may include the simultaneous optimization of waveform ISL and spectral characteristics using a gradient descent method, such as a "steepest descent method" or a "conjugate gradient method," as will be described in more detail below.

FIG. 2 depicts flowcharts of exemplary methods consistent with the present disclosure. Method 150 may include generating a function that quantifies radar signal characteristics (step 152), calculating time-domain derivatives of the function in the frequency domain (step 154), and then using the time domain derivatives to iterate or optimize the function (step 156).

Method 160 may include generating a function that quantifies radar signal characteristics as a sum of sidelobe levels (step 162), minimizing the function by obtaining gradients of the function in the spectral domain (step 164), and using the minimized function to generate a waveform that controls radar sidelobe levels (step 166).

FIG. 3 depicts a flowchart of an exemplary method 202 for generating an optimized waveform, which may include the step of creating an objective function that quantifies radar signal characteristics (step 204). For example, a given arbitrary set of waveform characteristics may be defined and optimized together to generate a transmitted waveform that is reasonably smooth looking and has desired pulse compression properties. In one embodiment, the initial created objective function may be the sum of the autocorrelation function's ISL of a filtered code. The value of the objective function may be lower for better signals and higher for worse performing signals, such that minimization of the objective function leads to desired waveforms.

Method 202 may also include defining spectral and time constraints to create a constrained optimization problem (step 206). The objective function may be defined to take the absolute value of each constraint, determine whether the value is larger than a constraint, and if so, take the square of the difference between the absolute value and the constraint. Thus, the objective function is higher valued in places where the constraint is not met, and quantifies how close the constraints are to being satisfied. Various defined constraints may include: (1) individual and composite time sidelobes, (2) individual and composite spectral sidelobes, (3) broadening characteristics, (4) mismatch filter losses, (5) waveform amplitude, etc. For example, given a spectrum of 235-450 MHz, it may be desired to create a notch in the spectrum between 250-260 MHz. It may also be desired to control time characteristics, such as the main beam peak, ISL and PSL levels, and the length of the waveform. In some embodiments, it may also be desirable to constrain the waveform to have a relatively constant amplitude. Constant amplitude waveforms allow transmitters to run at saturation (full power) and prevent potential max power from being wasted during transmission. The objective function may also include antenna constraints if it is desirable to prevent an antenna from transmitting in a certain direction, e.g., due to clutter in that direction.

Thus, the objective function may be a function that maps vectors corresponding to a discretized version of the waveform or filter into a real value. For each type of constraint, the necessary objective functions may be described in the spectral domain using the fast convolution technique. The necessary gradients may then be created in the spectral domain and mapped back to the time domain, as will be described below in more detail.

Method 202 may further include converting the constrained optimization problem into an unconstrained optimization problem (step 208). For example, the constrained optimization problem described above may be transformed into an unconstrained optimization problem by, for example, using a penalty method (described above), an augmented Lagrange method, etc.

Method 202 may further include using a gradient descent method to solve the unconstrained optimization problem (step 210). Any suitable optimization technique may be used to solve the unconstrained optimization problem. However, in certain embodiments, a gradient descent method, such as the steepest descent method, or conjugate gradient method, may be desirable. Such methods may involve taking the gradient of the objective function with respect to each one of the individual components, and performing a 1-D line search in the negative gradient or similar direction to find a minimum. In one exemplary embodiment, a conjugate gradient method (e.g., Polak-Ribiere method) may be used, as will be described in more detail below.

Method 202 may also include outputting the optimized waveform obtained by solving the unconstrained optimization problem (step 212). For example, as described above, computer 102 may store, display, and/or transmit the generated optimized waveform to waveform generator 103. Waveform generator 103 may then send the optimized waveform to power amplifier transmitter 104, where it is directed to antenna 108 through duplexer 106.

Method 214 for performing radar pulse compression, may include transmitting a modulated radar pulse based on an optimized waveform generated by method 202 (step 216). In particular, antenna 108 may be configured to transmit a modulated radar pulse based on the optimized waveform (step 216). For example, power amplifier 104, duplexer 106, and antenna 108 may be used to transmit a waveform similar to a linear frequency modulated radar pulse, by inhabiting each of the desired frequencies, and skipping bands that are not desired. Antenna 108 may also be configured to receive a reflected modulated echo waveform (step 218). The received echo waveform may be passed through low-noise amplifier 110, mixer 112, and IF amplifier 114 to pulse compression filter 116. The pulse compression filter 116 may be configured to compress the reflected, modulated echo waveform based on the optimized waveform (step 220). For example, pulse compression filter 116 may apply any type or combination of autocorrelation or cross-correlation matched or mismatched filters 118.

Method 214 may also include applying one or more matched or mismatched filters and/or weighting filters to minimize time sidelobes and other characteristics (step 220). For example, pulse compression filter 116 may include any number or type of mismatched filters and/or weighting filters 120 designed to control time sidelobes or filter unwanted spectral components of the received signal. For example, a secondary algorithm may be used to control time sidelobes and improve range resolution to efficiently extract desired information from returned signal. Inputs to a mismatched filter may include constraints on broadening, length, and total and individual sidelobe levels. Method 214 may also include performing further signal processing, as desired.

FIG. 4 depicts a particular exemplary embodiment of a method 302 for generating an ISL-optimized waveform, consistent with the more general methods 150, 160, and 202. For example, in one embodiment, method 302 may include creating an objective function that quantifies radar signal characteristics as a sum of the integrated sidelobe levels (ISL) (step 304). One exemplary constrained optimization problem corresponds to minimizing the integrated sidelobes of a pulse compression waveform subject to waveform spectral and amplitude considerations. For example, an exemplary function that would control frequency domain content as well as time sidelobe behavior along with a degree of waveform amplitude control would be to solve the constrained optimization problem:

$$\text{Minimize} \sum_i |R_i(\vec{x}, \vec{x})|^2$$

$$\text{Subject to } P_i(\vec{x}) \leq c_i, |x_i|^2 \leq d_i \text{ and } |x_i|^2 \leq d_i$$

where $\vec{x}$ is a vector comprising a discretized version of the waveform; where $R_i$ is the $i^{th}$ correlation sidelobe; and the summation of the absolute values squared of the $R_i$ defines the integrated sidelobes. Moreover, $P_i$ is the I'th element of the discretized spectral power of the waveform; $c_i$ is some constant that describes the max spectral power levels in the frequency domain; and $|x_i|$ is the amplitude component desired to be a constant $d_i$.

A penalty method may be used to convert the above constrained optimization problem into an unconstrained optimization problem via the construction of an appropriate objective function, which can be solved using the conjugate gradient method, as described below. The solution of this problem may yield a near constant amplitude waveform with suitable integrated sidelobe level (ISL) behavior and user-controlled frequency domain behavior.

Thus, method 302 may include defining spectral and time constraints as discussed above to further constrain the optimization problem (step 306), and then using a penalty method to convert the constrained optimization problem into an unconstrained optimization problem (step 308). In general, a penalty method may include converting formal constraints into terms of the objective function whose minimization achieves the desired results. For example, if it were desired to minimize ISL, the objective function would be the ISL (i.e., sum of squares of time sidelobes) and penalty terms would be added for additional sidelobe characteristics desired to be suppressed. If one region of spectrum is desired to be suppressed, the spectrum can be discretized, and a penalty term added to the objective function in the form of the square of the difference between the discretized spectral power and the goal when the power is greater than the goal, (i.e. $(P_i(\vec{x})-c_i)^2$ where $P_i(\vec{x})$ is the power at the I'th discretized component of the spectrum and $c_i$ is the goal at that position. Thus, the penalty method can be utilized to supplement the initial objective function in order to formulate an unconstrained optimization problem suitable for use with the conjugate gradient method.

As described above, a useful function may be constructed to implement the above information using a penalty method, which transforms a constrained optimization problem of the form:

$$\text{Minimize} f(\vec{x})$$

$$\text{Subject to } g_i(\vec{x}) \leq k_i \text{ for } i=1,\ldots,L.$$

into an unconstrained optimization. To accomplish this, a sequence of functions $g_p(\vec{x})$ may be formed for which:

$$g_P(\vec{x}) = f(\vec{x}) + \sum_{i=1}^{L} p_i(g_i(\vec{x}) - k_i)^2, \text{ where } p_i = 0 \text{ if } g_i(\vec{x}) <= k_i,$$

and equals a large positive constant, p, otherwise.

Thus, a sequence of functions $g_p(\vec{x})$ may be minimized with ever-increasing values of p until the constraints are sufficiently well satisfied. For each new and larger value of p, the optimization can be initialized with optimal value of $\vec{x}$ for the previous value of p, until the ith element of $\vec{g}$ reaches a given level. If $g_i$ is desired to be less than $k_i$, the term "$p_i(g_i(\vec{x})-k_i)^2$" can be added it to the rest of the objective function when $g_i(\vec{x})>k_i$ to achieve the same result that the formal constraint "$g_i(\vec{x})<=k_i$" would have.

When this penalty process is applied to the sidelobe minimization function described above, the following result for $g_p(\vec{x})$ may be obtained.

$$g_p(\vec{x})h_1(\vec{R}(\vec{x},\vec{x}))+h_2(\vec{P}(\vec{x}))$$

Once the penalty method has been used to convert the constrained optimization problem into an unconstrained optimization problem, the method can further include obtaining gradients in the spectral domain (step 310). In particular, it may be desirable to define various parameters in the spectral domain instead of the time domain, by using the Fourier transform. In one exemplary embodiment, pulse compression may be performed in the frequency domain by (1) taking the Fourier transform of the signal to be compressed, (2) taking the Fourier transform of the filter to be compressed against, (3) conjugating one of the transformed values, (4) multiplying the two values, and (5) taking the inverse Fourier transform of the product. Performing pulse compression in the frequency domain may speed up pulse compression calculations by performing them at a speed on the order of log_2 (N)*N where N is the number of components of the vectorized signal.

However, optimization in the spectral domain may be limited by the gradients that can be obtained in the spectral domain (i.e., the gradients that can be calculated using FFT techniques). In particular, it can be desirable to obtain the gradient of functions involving the circular correlation of two vectors, and the convolution of a vector with itself. Equations (1) and (2) below may be utilized to calculate the gradients desired in using FFTs to ensure that large scale problems can be solved with modest hardware requirements, by working in the spectral domain.

For purposes of illustration, if $\vec{x}$ and $\vec{y}$ are two complex vectors of length N (representing the waveform code $\vec{x}$ and filter $\vec{y}$ in the time domain), the circular correlation $\vec{R}(\vec{x},\vec{y})$ of the two vectors may be found by point-wise multiplication of the conjugate of the discrete Fourier transform of one of the vectors with the discrete Fourier transform of the other vector, and then applying an inverse Fourier transform to the result. In practice, the process of calculating the Fourier, and inverse Fourier transforms may be accomplished using FFT methods, but for simplicity of notation, may be expressed using an N×N discrete Fourier matrix denoted by the symbol F. In this way, the discrete Fourier transform $\vec{X}$ and $\vec{Y}$ are given by $\vec{X}=F\vec{x}$, $\vec{Y}=F\vec{y}$. Similarly $\vec{x}=F^{-1}\vec{X}$ and $\vec{y}=F^{-1}\vec{Y}$.

Using this notation, the correlation $\vec{R}(\vec{x},\vec{y})=F^{-1}(\overline{F\vec{x}}\circ F\vec{y})=F^{-1}(\overline{\vec{X}}\circ\vec{Y})$ where $\circ$ denotes the Hadamard or Schur product, which is defined by pointwise multiplication of two equal sized matrices or vectors.

In order to minimize the objective function, as described above, it may be desirable to minimize real valued functions of the form $h(\vec{R}(\vec{x},\vec{y}))=\Sigma h_i(\vec{R}(\vec{x},\vec{y}))$. In order to do this, it may be useful to calculate the function $\nabla_{\vec{y}}h$ efficiently. This can be done using the function:

$$\nabla_{\vec{y}}h=F^{-1}(\text{conj}(\text{conj}(F\nabla_{\vec{R}}h)\circ F\vec{x})). \qquad (1)$$

where $\nabla_{\vec{R}}h$ is the gradient of h with respect to R (the correlated sidelobes), and $F\vec{x}$ is the FFT, which maps the time domain $\vec{x}$ into the frequency domain. Thus, equation (1) can be used to obtain the gradient of $h(\vec{R}(\vec{x},\vec{y}))$, the advantage being that the inverse FFT has taken the gradient back into the time domain.

Similarly, if the interest is in manipulating the spectral component of the vector $\vec{x}$ via optimization of a function of the spectral power $\vec{P}(\vec{x})$, given by $h(\vec{P}(\vec{x}))=\Sigma h_i(\vec{P}(\vec{x}))$ where $\vec{P}(\vec{x})=\vec{X}\circ\overline{\vec{X}}$ (i.e. the convolution of $\vec{x}$ with itself) then the following gradient can be used:

$$\nabla_{\vec{x}}\vec{h}=F^{-1}(2N\nabla_{\vec{P}}\vec{h}\circ\vec{X}). \qquad (2)$$

where $\nabla_{\vec{P}}\vec{h}$ is the gradient of $\vec{h}$ with respect to $\vec{P}$ (i.e., the vectorized power of the waveform in the spectral domain) and $2N\nabla_{\vec{P}}h\circ\vec{X}$ is moved from the frequency domain back into time domain by the inverse FFT. Thus, the function $\vec{h}(\vec{P}(\vec{x}))$ can then be minimized using a conjugate gradient algorithm, which implements the gradient described in equation (2). As described above, because the penalty method may be used to obtain $g_p(\vec{x})$ in the form: $g_p(\vec{x})=h_1(\vec{R}(\vec{x},\vec{x}))+h_2(\vec{P}(\vec{x}))$, the gradients $\nabla_{\vec{x}}q_p$ may be obtained using equations (1) and (2) above.

In one embodiment, the Polak-Ribiere conjugate gradient method can then utilize the above gradients to find optima of the respective functions (step 312). For instance, the conjugate gradient algorithm may start with an initial guess to a local minimum $\vec{x}_0$, and proceed with a line search to find a minimum in the negative gradient direction to find a better estimate $\vec{x}_1$. From that point forward, a sequence of line searches may be used which would, in the case of a purely quadratic minimization problem, force the algorithm to converge in a number of steps less than or equal to the number of DOFs.

The algorithm may include starting with an initial estimate $\vec{x}_0$:

1. Let $\vec{g}_0=\nabla f(\vec{x}_0)$ and let $\vec{d}_0=-\vec{g}_0$.
2. For k=0 ... n−1
   a. Let $\vec{x}_{k+1}=\vec{x}_k+\alpha_k\vec{d}_k$ where $\alpha_k$ minimizes $f(x+\alpha\vec{d}_k)$
   b. Compute $\vec{g}_{k+1}=\nabla f(\vec{x}_{k+1})$
   c. If k=n−1 go to step 3, otherwise let $\vec{d}_{k+1}=-\vec{g}_{k+1}+\beta_k\vec{d}_k$, where $$\beta_k = \frac{\text{real}(\vec{g}_{k+1}-\vec{g}_k)^T\text{real}(g_k)+\text{imag}(\vec{g}_{k+1}-\vec{g}_k)^T\text{imag}(\vec{g}_k)}{\text{real}(\vec{g}_k)^T\text{real}(\vec{g}_k)+\text{imag}(\vec{g}_k)^T\text{imag}(\vec{g}_k)}$$

3. Replace $\vec{x}_k$ by $\vec{x}_o$ and return to step 1 until a suitable solution for $\vec{x}$ is obtained. As described above, any obtained optimized waveform $\vec{x}$ can then be saved, stored, and/or transmitted to waveform generator 103 for use in radar pulse compression system 100 (step 314).

Accordingly, the presently-disclosed systems and methods may be used to perform optimization of both time and spectral characteristics of a constant amplitude or near constant amplitude pulse compression code or waveform, by using frequency domain calculations instead of time domain calculations. Specifically, the above objective function may be minimized to control integrated-sidelobe-levels (ISL), and peak sidelobe levels (PSL) in the time domain and spectral levels in the frequency domain, by calculating the time-domain derivatives of this objective function with relevant calculations in the frequency domain. Thus, the waveform ISL and spectral characteristics may be quickly and simultaneously optimized using a suitable gradient descent method. Because the calculations are performed in the frequency domain with the number of calculation of the order of log_2base N, they can be performed more quickly. Moreover, in SAR applications, and other radar applications having large time-bandwidth products, it will be faster and less processing power-intensive to perform radar sidelobe suppression in pulse compression signal processing.

Although described herein primarily in relation to radar pulse compression, the exemplary methods and systems described herein may be applied to any type of electromagnetic waveforms, such as communications waveforms. Thus, the presently disclosed systems and methods may be used for pulse compression processing of communications waveforms, so as to control and reduce unwanted spectral sidelobes that may interfere with communications in adjacent bandwidths.

It will be apparent to those skilled in the art that various modifications and variations can be made in the system and method for reception in communication networks. It is intended that the standard and examples be considered as exemplary only, with a true scope of the disclosed embodiments being indicated by the following claims and their equivalents.

What is claimed is:

1. A computer-implemented method of suppressing radar sidelobes in pulse compression signal processing, the method comprising:
    creating an objective function that quantifies radar signal characteristics;
    defining spectral and time constraints to further constrain the objective function;
    converting the objective function and constraints into an unconstrained optimization problem; and
    using a processor to perform a gradient descent method to solve the unconstrained optimization problem and generate an optimized radar waveform.

2. The method of claim 1, further comprising:
    transmitting a modulated radar pulse from an antenna based on the optimized radar waveform.

3. The method of claim 1, further comprising:
    obtaining gradients of the unconstrained optimization problem in the spectral domain.

4. A computer-implemented method of suppressing radar sidelobes in pulse compression signal processing, the method comprising:
    creating an objective function that quantifies radar signal characteristics as a sum of integrated sidelobe levels of a radar pulse;
    defining spectral and time constraints to further constrain the objective function;
    converting the objective function and constraints into an unconstrained optimization problem using a penalty method; and
    using a processor to obtain gradients of the unconstrained optimization problem in the spectral domain.

5. The method of claim 4, further comprising, using a conjugate gradient method to solve the unconstrained optimization problem, minimize the integrated sidelobe levels, and generate an optimized mismatched filter.

6. The method of claim 5, further comprising, performing signal processing of a modulated radar pulse from an antenna based on the optimized filter.

7. A system for suppressing radar sidelobes in pulse compression signal processing, the system comprising:
    a memory configured to store instructions for generating an optimized radar waveform; and
    a processor configured to:
        receive an objective function that quantifies radar signal characteristics;
        define spectral and time constraints to further constrain the objective function;
        convert the objective function and constraints into an unconstrained optimization problem; and
        use a gradient descent method to solve the unconstrained optimization problem and generate an optimized radar waveform.

8. The system of claim 7, further comprising:
    an antenna configured to transmit a modulated radar pulse from an antenna based on the optimized radar waveform.

9. The system of claim 7, wherein the processor is further configured for obtaining gradients of the unconstrained optimization problem in the spectral domain.

10. A computer-implemented method of generating an optimized mismatched filter for a pulse compression radar system, the method comprising:
    receiving spectral and time constraints that define a radar pulse;
    creating an objective function that quantifies radar signal characteristics as a sum of integrated sidelobe levels of a radar pulse, based on the spectral and time constraints;
    converting the objective function and constraints into an unconstrained optimization problem using a penalty method; and
    using a processor to obtain gradients of the unconstrained optimization problem in the spectral domain.

11. The method of claim 10, further comprising:
    using a conjugate gradient method to solve the unconstrained optimization problem, minimize the integrated sidelobe levels, and generate an optimized mismatched filter.

12. The method of claim 11, further comprising, performing signal processing of a modulated radar pulse from an antenna based on the optimized filter.

13. A computer-implemented method of radar pulse compression signal processing, the method comprising:
    generating a function that quantifies radar signal characteristics; and
    using a processor to calculate time-domain derivatives of the function in the frequency domain.

14. The method of claim 13, further comprising,
    using a gradient descent method to solve the function and generate an optimized radar waveform.

15. The method of claim 14, further comprising:
    performing signal processing of a modulated radar pulse from an antenna based on the optimized radar waveform.

16. The method of claim 13, further comprising using the time-domain derivatives to minimize the function.

17. The method of claim 13, further comprising using the time-domain derivatives to obtain waveform properties, using an iterative scheme based on the function.

18. A computer-implemented method for radar pulse compression signal processing, the method comprising:
    generating a function that quantifies radar signal characteristics; and using a processor to optimize time and spectral characteristics of the radar signal characteristics using frequency domain calculations.

19. The method of claim 18, further comprising,
using a gradient descent method to solve the function and generate an optimized radar waveform.

20. The method of claim 19, further comprising:
performing signal processing of a modulated radar pulse from an antenna based on the optimized radar waveform.

21. The method of claim 18, further comprising: calculating time-domain derivatives of the function in the frequency domain; and using the time-domain derivatives to minimize the function.

22. The method of claim 18, further comprising: calculating time-domain derivatives of the function in the frequency domain; and using the time-domain derivatives to obtain waveform properties using an iterative scheme based on the function.

23. A computer-implemented method of radar pulse compression signal processing, the method comprising:
generating a function that quantifies radar signal characteristics as a sum of sidelobe levels; and
using a processor to minimize the function by obtaining gradients of the function in the spectral domain.

24. The method of claim 23, wherein minimizing the function includes minimizing the integrated sidelobe levels.

25. The method of claim 23, further comprising,
using a gradient descent method to solve the function and generate an optimized radar waveform.

26. The method of claim 25, further comprising:
performing signal processing of a modulated radar pulse from an antenna based on the optimized radar waveform.

27. The method of claim 23, further comprising: calculating time-domain derivatives of the function in the frequency domain; and using the time-domain derivatives to minimize the function.

28. The method of claim 23, further comprising: calculating time-domain derivatives of the function in the frequency domain; and using the time-domain derivatives to obtain waveform properties using an iterative scheme that uses the function.

29. A computer-implemented method of radar pulse compression signal processing, the method comprising:
generating a function that quantifies radar signal characteristics as a sum of functions of sidelobe levels; and
using a processor to control the sidelobe levels by obtaining gradients of the function in the spectral domain.

30. The method of claim 29, further comprising,
using a gradient descent method to solve the function and generate an optimized radar waveform.

31. The method of claim 30, further comprising:
performing signal processing of a modulated radar pulse from an antenna based on the optimized radar waveform.

32. The method of claim 29, further comprising: calculating time-domain derivatives of the function in the frequency domain; and using the time-domain derivatives to minimize the function.

33. The method of claim 29, further comprising: calculating time-domain derivatives of the function in the frequency domain; and using the time-domain derivatives to obtain waveform properties using an iterative scheme that uses the function.

34. A system for suppressing radar sidelobes in pulse compression signal processing, the system comprising:
a memory configured to store instructions for generating an optimized radar waveform;
a processor configured to:
generate a function that quantifies radar signal characteristics as a sum of functions of sidelobe levels; and
control the sidelobe levels by obtaining gradients of the function in the spectral domain.

* * * * *